(12) United States Patent
Kokkonen (10) Patent No.: US 11,086,655 B2
(45) Date of Patent: *Aug. 10, 2021

(54) DEVICE AND METHOD FOR HARDWARE VIRTUALIZATION SUPPORT USING A VIRTUAL TIMER NUMBER

(71) Applicant: Huawei Technologies Co., Ltd., Shenzhen (CN)

(72) Inventor: Jani Kokkonen, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,638

(22) Filed: Jul. 17, 2019

(65) Prior Publication Data

US 2019/0340008 A1   Nov. 7, 2019

Related U.S. Application Data

(63) Continuation of application No. 15/456,100, filed on Mar. 10, 2017, now Pat. No. 10,394,592, which is a
(Continued)

(30) Foreign Application Priority Data

Jul. 15, 2015 (EP) .................................... 15176883

(51) Int. Cl.
*G06F 9/455* (2018.01)
*G06F 9/48* (2006.01)
*G06F 9/445* (2018.01)

(52) U.S. Cl.
CPC ...... *G06F 9/45558* (2013.01); *G06F 9/44505* (2013.01); *G06F 9/4812* (2013.01); *G06F 2009/45575* (2013.01)

(58) Field of Classification Search
None
See application file for complete search history.

(56) References Cited

U.S. PATENT DOCUMENTS

9,330,035 B2   5/2016   Jebson et al.
9,355,050 B2 *  5/2016   Zeng ..................... G06F 9/4812
(Continued)

FOREIGN PATENT DOCUMENTS

CN   1916855 A   2/2007
CN   101256503 A   9/2008
(Continued)

OTHER PUBLICATIONS

Machine Translation and Abstract of Chinese Publication No. CN103514043, Jan. 15, 2014, 34 pages.
(Continued)

*Primary Examiner* — Bing Zhao
(74) *Attorney, Agent, or Firm* — Conley Rose, P.C.

(57) ABSTRACT

A device for hardware virtualization support is provided, comprising a hypervisor component configured to launch a virtual machine (VM) and configured to exit and/or to enter a host level; a host system component configured to process a configuration flag that enables an interrupt delivery mechanism; wherein the host system component is configured to record, if the configuration flag is set, a virtual timer number as a global variable, providing information to the hypervisor component when a virtual timer is expired; and wherein the hypervisor component is configured to process the virtual timer number of the global variable in the host level.

20 Claims, 4 Drawing Sheets

Related U.S. Application Data continuation of application No. PCT/CN2016/084570, filed on Jun. 2, 2016.

(56) References Cited

U.S. PATENT DOCUMENTS

| | | |
|---|---|---|
| 2008/0155536 A1 | 6/2008 | Levit-Gurevich et al. |
| 2008/0288940 A1 | 11/2008 | Adams et al. |
| 2009/0113110 A1 | 4/2009 | Chen et al. |
| 2009/0259870 A1 | 10/2009 | Sharma et al. |
| 2011/0296411 A1 | 12/2011 | Tang et al. |
| 2013/0275638 A1 | 10/2013 | Serebrin et al. |
| 2014/0351472 A1 | 11/2014 | Jebson et al. |

FOREIGN PATENT DOCUMENTS

| | | |
|---|---|---|
| CN | 101398768 A | 4/2009 |
| CN | 102792272 A | 11/2012 |
| CN | 103514043 A | 1/2014 |

OTHER PUBLICATIONS

Foreign Communication From a Counterpart Application, Chinese Application No. 201680041585.9, Chinese Office Action dated Dec. 27, 2019, 4 pages.

Foreign Communication From a Counterpart Application, Chinese Application No. 201680041585.9, Chinese Search Report dated Dec. 18, 2019, 2 pages.

"ARMv7-A and ARMv7-R edition Errata markup," ARM Architecture Reference Manual, 2011, 2158 pages.

"Architecture Specification," ARM Generic Interrupt Controller, Architecture Version 2.0, 2011, 212 pages.

Dall, C., et al., "KVM/ARM: Experience Building the Linux ARM Hypervisor," Apr. 2013, 19 pages.

Dall, C., et al., "KVM/ARM: The Design and Implementation of the Linux ARM Hypervisor," XP058050391, ASPLOS, Proceedings of the ACM Sigplan Conference on Programming Language Design and Implementation, vol. 49, No. 4, Mar. 1-4, 2014, pp. 333-347.

Foreign Communication From a Counterpart Application, European Application No. 15176883.5, Extended European Search Report dated Feb. 3, 2016, 7 pages.

Foreign Communication From a Counterpart Application, PCT Application No. PCT/CN2016/084570, English Translation of International Search Report dated Jul. 26, 2016, 4 pages.

\* cited by examiner

```
timer {
         compatible = "arm,cortex-a15-timer",
                 "arm,armv7-timer";
         interrupts = <1 13 0xf08>,
                 <1 14 0xf08>,
                 <1 11 0xf08>,
                 <1 10 0xf08>;
         clock-frequency = <100000000>;
};
```

DEVICE AND METHOD FOR HARDWARE VIRTUALIZATION SUPPORT USING A VIRTUAL TIMER NUMBER

CROSS-REFERENCE TO RELATED APPLICATIONS

This application is a continuation of U.S. patent application Ser. No. 15/456,100, filed on Mar. 10, 2017, which is a continuation of International Application No. PCT/CN2016/084570, filed on Jun. 2, 2016, which claims priority to European Patent Application No. EP15176883.5, filed on Jul. 15, 2015. All of the afore-mentioned patent applications are hereby incorporated by reference in their entireties.

TECHNICAL FIELD

The present application relates to the field of virtual timer delivery. In particular, the present application relates to a device and a method for hardware virtualization support.

BACKGROUND

Various computer central processor instruction sets are used today. One type of them, the Advanced Reduced Instruction Set Computing (RISC) Machines (ARM) architecture, provides optional hardware (HW) extensions support or HW virtualization support. For instance, in ARM version 7 (ARMv7), as introduced in 2004, and in ARM version 8 (ARMv8) architectures, such HW virtualization support is present and supported.

Even though ARM adds HW features to support virtualization, there is still a need for hypervisor software in order to handle virtualization events. Hypervisor software, as compared to HW-based virtualization solution, provides flexibility in the form of easy extensibility of virtualization features, but downsizes its performance overhead due to lack of HW acceleration on software (SW) handled operations. One area that is affected by this performance overhead is the virtual timer interrupt delivery in ARM platforms.

SUMMARY

It is an object of the present disclosure to provide an improved hardware virtualization support.

This object is achieved by the features of the independent claims. Further implementation forms are apparent from the dependent claims, the description, and the figures.

According to a first aspect, a device for hardware virtualization support is provided, the device comprising a hypervisor component configured to launch a virtual machine (VM) and configured to exit and/or to enter a host level, a host system component configured to process a configuration flag (CF) that enables an interrupt delivery mechanism, wherein the host system component is configured to record, if the CF is set, a virtual timer number as a global variable, providing information to the hypervisor component when a virtual timer is expired, and wherein the hypervisor component is configured to process the virtual timer number of the global variable in the host level.

The device for hardware virtualization support provides improved virtual timer delivery time in ARM chips based on generic interrupt controller (GIC) version 2 and/or 3 (GICv2/3). The hindrance with regard to virtual timer delivery in ARM chips based on GICv2/3 is that the hardware is not able to send a virtual timer directly to the guest operating system (OS).

Thus, the expiration of a virtual timer may generate a physical interrupt which may cause an exit to the hypervisor mode and then to the host OS which updates kernel-based virtual machine (KVM) software structures related to the GIC and then returns to the hypervisor mode which updates physical GIC registers before returning to guest OS mode. Thus, the delivery of a virtual timer may require a significant amount of work by the software layer, for example, processing time and/or memory requirements.

The device for hardware virtualization support allows simplifying interrupt delivery paths, and therefore shortens the virtual timer delivery time.

For example, the device for hardware virtualization support may comprise a LINUX KVM hypervisor code part that may provide code to perform a "word switch", for example, the possibility to launch a VM and exit and/or enter the host LINUX level. The hypervisor code may also be responsible for writing and/or reading into a physical GIC, for instance, as the interrupt controller.

For example, the device for hardware virtualization support may comprise a LINUX host system that may be extended with a supplementary CF that enables a fast interrupt delivery mechanism.

For example, the LINUX host system may be extended with an additional CF, for example, defined as CONFIGURE_KVM_TIMER_OPTIMIZATION.

Processing the new CF and considering the new CF may enable a quicker interrupt delivery mechanism when compared to a mechanism without a supplementary CF.

If the CF is set, the host system, for example. The LINUX host system, may record the virtual timer number in a global variable so that the hypervisor mode knows when virtual timer has expired and can use the fast path mechanism if the fast path mechanism is enabled.

The hypervisor mode may be extended to account for a fast delivery option.

For example, the device for hardware virtualization support may be configured to run several VMs on a single physical central processing unit (CPU). The device for hardware virtualization support may also be configured to run one VM on one physical CPU.

In a first possible implementation form of the device according to the first aspect, the host system component is configured to perform a virtualization specification for a physical interrupt taken in a hypervisor mode. This provides a reduction in time by mapping a virtual interrupt for the guest OS.

In a second possible implementation form of the device according to the first aspect or according to the first implementation form of the first aspect, the host system component is configured to restore a host OS state, to mark an exit reason to a register, and to return to the host OS state. This provides an improved performance of the virtual timer delivery to the guest OS.

In a third possible implementation form of the device according to the first aspect or according to the any one of the preceding implementation forms of the first aspect, the host system component is configured to perform a virtual timer performance optimization if an optimization flag (OF) is enabled. This provides an embedded mechanism based on a check for improving the virtual timer performance. For example, a virtual timer delivery time optimization is provided. Virtual timer performance is improved because an extra exit to a host state is avoided.

In a fourth possible implementation form of the device according to the first aspect or according to the any one of the preceding implementation forms of the first aspect, when the OF is enabled, the host system component is configured to optimize a hypervisor return path to a guest OS state. This provides an improved performance of the hardware virtualization support. Hence, a virtual timer delivery time optimization is provided.

In a fifth possible implementation form of the device according to the first aspect or according to the any one of the preceding implementation forms of the first aspect, when the OF is enabled, the host system component is configured to update a GIC list register and to return to the guest OS state when an expiration of the virtual timer is detected. This provides an adjusted hardware virtualization support and returning to the guest OS state. The virtual timer delivery to the guest OS is thus faster.

In a sixth possible implementation form of the system according to the first aspect or according to the any one of the preceding implementation forms of the first aspect, the hypervisor component is configured to record a virtual timer IRQ number in a timer device tree entry. This provides an adjusted hardware virtualization support. The term IRQ as used by the present disclosure refers to the term "interrupt request". In other words, an IRQ is a signal that is sent to the computer processor to stop the processor momentarily while it decides which task it should perform next. This causes asynchronous exit to the interrupt handler once an interrupt occurs.

In a seventh possible implementation form of the system according to the first aspect or according to any of the preceding implementation forms of the first aspect, the hypervisor component is configured to specify the virtual IRQ number. This provides an improved performance of the virtual interrupts. In other words, the performance is improved, when the virtual IRQ number is specified.

The reason is that normally a hypervisor component may not be aware which interrupt should be handled by the guest OS and which one by host OS. By employing a virtual IRQ number a unique assignment of interrupts to guest OS or host OS is possible.

When an interrupt occurs then the hypervisor component goes to the host state because the interrupt might be targeted for the host OS. If the host OS does not handle the interrupt and acknowledges the interrupt in the end then it will be handled by the KVM which checks which of the VMs should handle it. That means that the KVM structures of the responsible VM are updated and then the KVM returns to the hypervisor mode and in hypervisor mode the actual HW registers for the virtual timer that is updated before returning to the guest OS. This extra round to host state is avoided if hypervisor component is aware that a physical IRQ is targeted to a running VM.

In an eighth possible implementation form of the system according to the first aspect as such or according to any of the preceding implementation forms of the first aspect, the hypervisor component is configured to specify the virtual IRQ number according to a physical IRQ number that is delivered to the hypervisor mode once the virtual timer is expired. This provides an improved performance of the virtual interrupts.

According to a second aspect, the present disclosure relates to a hypervisor component for hardware virtualization support, wherein the hypervisor component is configured to launch a VM and configured to exit and/or to enter a host level and to process a virtual timer number of a global variable in the host level.

According to a third aspect, the disclosure relates to a host system component for hardware virtualization support, wherein the host system component is configured to process a CF that enables an interrupt delivery mechanism, wherein the host system component, if the CF is set, is configured to record a virtual timer number as a global variable, providing information to a hypervisor component according to the second aspect when a virtual timer is expired.

According to a fourth aspect, the present disclosure relates to a method for hardware virtualization support, the method comprising the following steps of launching a VM by a hypervisor component and exiting and/or entering a host level, processing a CF by a host system component, wherein the CF enables an interrupt delivery mechanism, if the CF is set, recording a virtual timer number as a global variable by the host system component, providing information to the hypervisor component when a virtual timer is expired, and processing the virtual timer number of the global variable in the host level by the hypervisor component.

In a first possible implementation form of the method according to the fourth aspect, the method further comprises the step of performing a virtualization specification for a physical interrupt taken in a hypervisor mode by the host system component. This provides a reduction of processing time by mapping a virtual interrupt for the guest OS.

The processing or delivery time is the time measured between an expiration of virtual timer, which always causes physical IRQ that is trapped to hypervisor mode, e.g., to EL2 mode, and the delivery of virtual timer to guest OS state. In other words, the processing or delivery time corresponds to the time measured between the time point of the expiration of virtual timer and the time point of the delivery of virtual timer to guest OS state.

In a second possible implementation form of the method according to the fourth aspect as such or according to the first implementation form of the method according to the fourth aspect, the method further comprises the steps of restoring a host OS state, marking an exit reason to a register and returning to the host OS state. This provides an improved performance of the virtual timer delivery to the guest OS.

In a third possible implementation form of the method according to the fourth aspect as such or according to the any of the preceding implementation forms of the method according to the fourth aspect, the method further comprises the step of performing a virtual timer performance optimization if an OF is enabled. This provides an embedded mechanism for enhancing the virtual timer performance.

The present disclosure can be implemented in digital electronic circuitry, or in computer hardware, firmware software, or in combinations thereof, e.g., in available hardware of conventional mobile devices or in new hardware dedicated for processing the methods described herein.

These and other aspects of the present disclosure will become apparent from and be elucidated with reference to the embodiments described hereinafter. A more complete appreciation of the present disclosure and the attendant advantages thereof will be more clearly understood with reference to the following schematic drawings.

BRIEF DESCRIPTION OF THE DRAWINGS

Further embodiments of the disclosure will be described with respect to the following figures, in which.

DETAILED DESCRIPTION

In the associated figures, identical reference signs denote identical or at least equivalent elements, parts, units or steps. In addition, it should be noted that all of the accompanying drawings are not to scale.

The technical solutions in the embodiments of the present disclosure are described clearly and completely in the following with detailed reference to the accompanying drawings in the embodiments of the present disclosure.

The present disclosure allows running several VMs on the same CPU, the advantage of the virtual timer delivery optimization can be achieved if one VCPU is running on single physical CPU.

The present disclosure provides a mechanism that avoids, in case existing KVM hypervisor code has been modified, entering back to Host OS mode once virtual timer expires i.e. after virtual timer expiration of the Host OS. Thus, hypervisor mode loop can be avoided.

Entering to hypervisor mode and back to Guest OS mode may still be performed because current ARM GIC architecture mandates to catch all physical interrupts in hypervisor mode. When a virtual timer may expire, hypervisor mode code path selects optimized virtual timer handling if LINUX kernel compiler time option CONFIGURE_KVM_TIMER_OPTIMIZATION—flag is enabled.

If the CONFIGURE_KVM_TIMER_OPTIMIZATION flag is enabled, then entering to the host OS state may be avoided. Instead a hypervisor return path to the guest OS state may be optimized such that when the hypervisor recognizes expiration of the virtual timer it may update the GIC list register directly and it may return back to the guest OS state. This way the delivery time of the virtual timer can be significantly improved.

The method for hardware virtualization support describes a virtual timer delivery optimization.

The GIC architecture may be used to define the architectural requirements for handling all interrupt sources for any processor connected to a GIC or to a common interrupt controller programming interface applicable to uniprocessor or multiprocessor systems.

According to an exemplary embodiment of the present disclosure, the GIC architecture may be used as a centralized resource for supporting and managing interrupts in a system that includes at least one processor. The GIC architecture may provide registers for managing interrupt sources, interrupt behavior, and interrupt routing to one or more processors, support for the ARM architecture and software-generated or virtual interrupts.

According to an exemplary embodiment of the present disclosure, a software based method to simplify and optimize virtual timer delivery time in KVM based hypervisor by avoiding unnecessary store and load of LINUX Host OS state is provided.

According to an exemplary embodiment of the present disclosure, changes to the KVM hypervisor code are used and to the LINUX host OS code. According to an exemplary embodiment of the present disclosure, these modifications are optional and configurable via the LINUX kernel CONFIGURE_KVM_TIMER_OPTIMIZATION—compiler flag.

Figure 1:
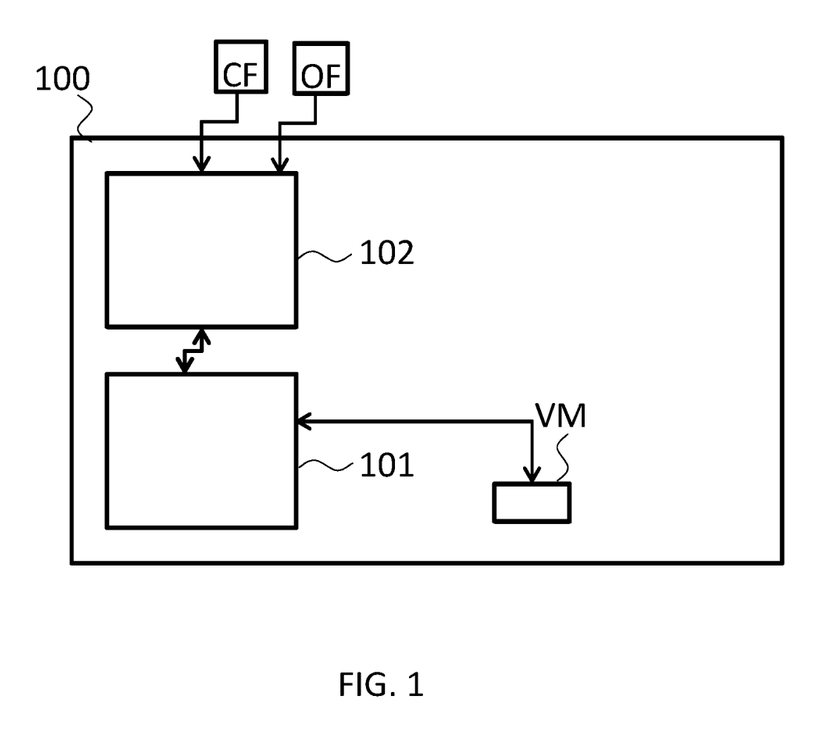
FIG. 1 shows a schematic diagram of a device for hardware virtualization support according to one embodiment of the present disclosure.

FIG. 1 shows a schematic diagram of a device for hardware virtualization support according to one embodiment of the present disclosure.

FIG. 1 shows an embodiment of a device 100 for hardware virtualization support, the device 100 comprises a hypervisor component 101 and a host system component 102.

The hypervisor component 101 is configured to launch a VM and may be configured to exit and/or to enter a host level, wherein the hypervisor component 101 is configured to process the virtual timer number of the global variable in the host level.

The host system component 102 is configured to process a CF that enables an interrupt delivery mechanism, wherein the host system component 102 is configured to record a virtual timer number as a global variable, if the CF is set, providing information to the hypervisor component 101 when a virtual timer is expired.

The host system component 102 may be configured to perform a virtual timer performance optimization if an OF is enabled.

The host system component 102 is configured to process a CF in form of a CONFIGURE_KVM_TIMER_OPTIMIZATION—flag.

Figure 2:
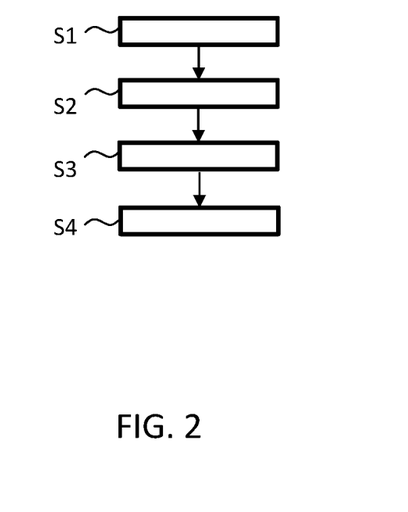
FIG. 2 shows a schematic diagram of a flowchart diagram of a method for hardware virtualization support according to an embodiment of the disclosure.

FIG. 2 shows a schematic diagram of a flowchart diagram of a method for hardware virtualization support according to an embodiment of the disclosure.

FIG. 2 describes virtual timer delivery optimization. According to an exemplary embodiment of the present disclosure, all steps S1 to S4 can be independent of each other.

As a first step S1 of the method, launching a VM by a hypervisor component 101 and exiting and/or entering a host level.

As a second step S2 of the method, processing a CF by a host system component 102 is conducted, wherein the CF enables an interrupt delivery mechanism.

As a third step S3 of the method, if the CF is set, recording a virtual timer number as a global variable by the host system component 102 is performed, providing information to the hypervisor component 101 when a virtual timer is expired.

As a fourth step S4 of the method, processing the virtual timer number of the global variable in the host level by the hypervisor component 101 is conducted.

Figure 3:
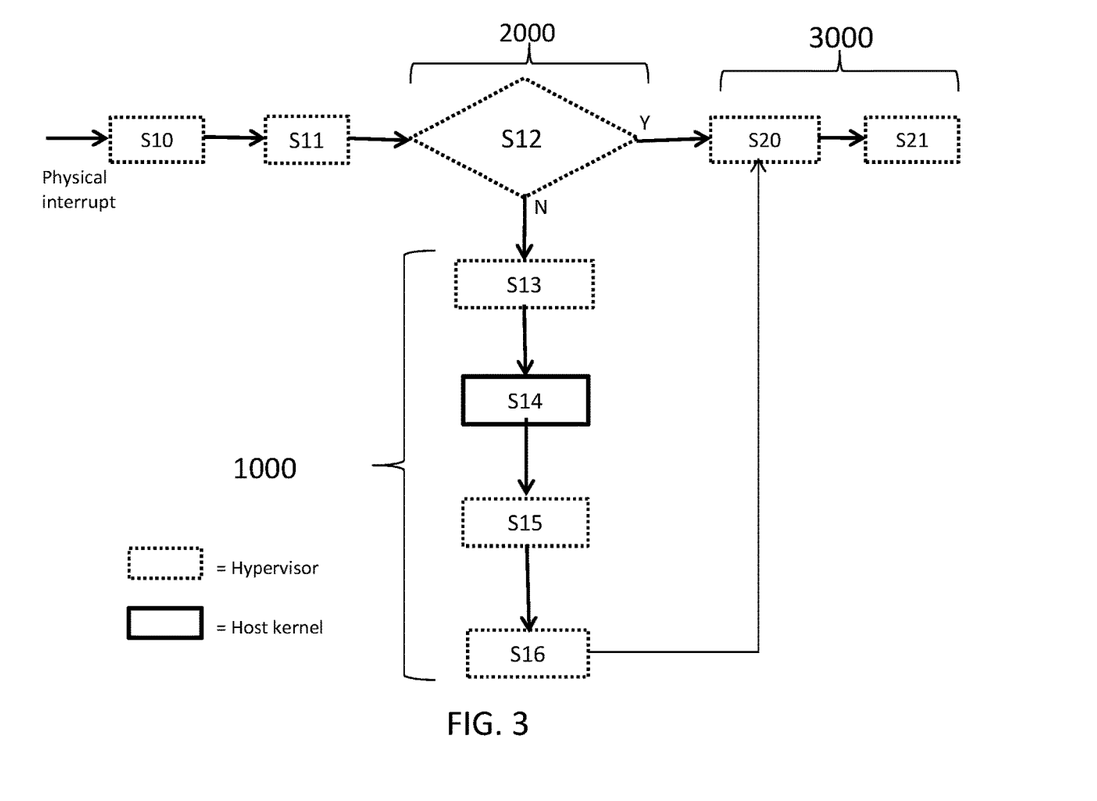
FIG. 3 shows a schematic diagram of a virtual timer delivery diagram in KVM based hypervisor according to one embodiment of the present disclosure.

FIG. 3 shows a schematic diagram of a virtual timer delivery diagram in KVM based hypervisor according to one embodiment of the present disclosure.

According to an exemplary embodiment of the present disclosure, the device 100 for hardware virtualization support may be configured to perform the following steps.

In step S10, triggered by a physical interrupt, the guest OS state is saved. In step S11, a hypervisor state is loaded.

A query part 2000 may use a LINUX kernel compilation flag to select either fast or slow path of virtual timer delivery. The query part 2000 may comprise the following steps.

In step S12, it may be determined whether the CONFIGURE_KVM_TIMER_OPTIMIZATION—flag is set.

If yes, then the procedure may be continued with a fast path 3000. If not, the procedure may be continued with a slow path 1000. The terms fast and slow may be used in relative respect to each other, e.g. defining that one path is faster or slower than the other.

For instance, if the kernel is not compiled to support CONFIGURE_KVM_TIMER_OPTIMIZATION—settings then the normal virtual timer delivery mechanism will be used i.e. slow path 1000. Otherwise, the fast path 3000 will be used.

The slow path 1000 may comprise the following steps.

In step S13, loading the host OS state may be conducted.

Subsequently, in step S14, updating the KVM software GIC state may be conducted.

In step S15, saving the host OS state may be conducted.

Finally, in step S16, loading the hypervisor state may be conducted.

The fast path 3000 may comprise the following steps.

In step S20, updating virtual CPU GIC registers may be conducted.

Subsequently, in step S21, loading the guest OS state may be conducted.

Figure 4:
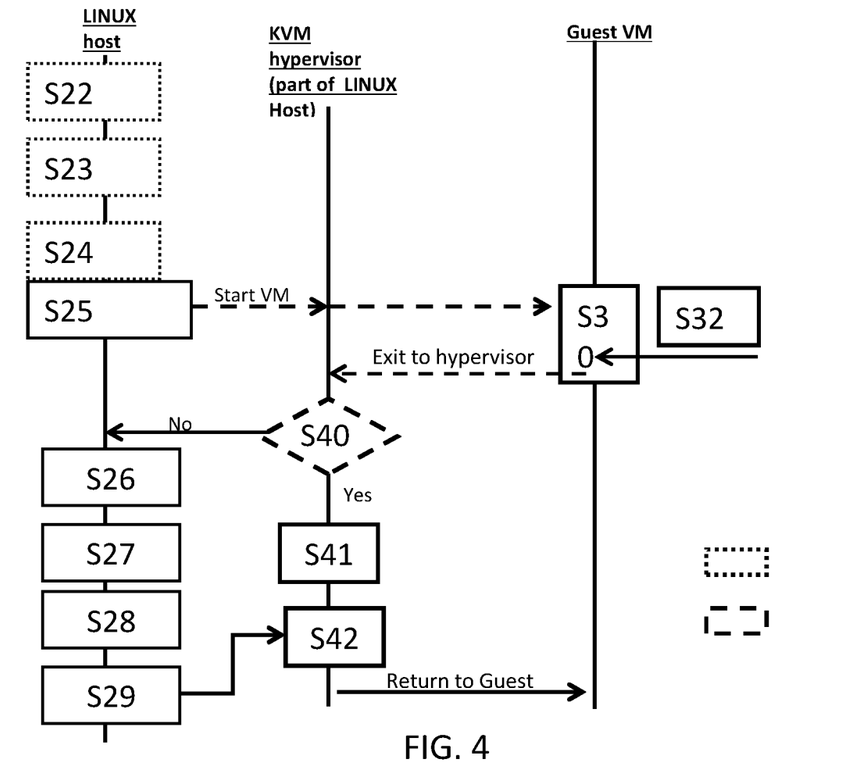
FIG. 4 shows a schematic diagram of modifications in the KVM hypervisor and the host system according to one embodiment of the present disclosure.

FIG. 4 shows a schematic diagram of modifications in the KVM hypervisor and the host system according to one embodiment of the present disclosure.

FIG. 4 shows the processes and steps performed between the LINUX host, the KVM hypervisor, and the guest VM. According to an exemplary embodiment of the present disclosure, the device 100 for hardware virtualization support may be configured to perform the following steps.

The optimized virtual timer delivery mechanism may be enabled in the host OS.

In step S22, applying virtual timer delivery optimization code to LINUX host and KVM hypervisor code may be conducted.

Subsequently, in step S23, selecting CONFIGURE_KVM_TIMER_OPTIMIZATION-compile option and compiling the host kernel may be conducted.

In the following, in step S24, recording the virtual timer physical interrupt number may be conducted. This may trigger the guest VM in step S30 to have the guest VM running.

Then, in step S25, configuring a single VM on single physical CPU based on normal LINUX tools may be performed.

Once a physical timer interrupt arrives in step S32, exiting to hypervisor mode may be conducted. Subsequently, it may be checked in step S40 if the CONFIGURE_KVM_TIMER_OPTIMIZATION flag is set.

If yes, the procedure may be continued with step S41, if not with step S26.

In step S26, load the host OS state may be conducted.

Subsequently, in step S27, updating the KVM software GIC state may be performed.

In the following, in step S28, saving the host OS state may be conducted.

Then, in step S29, loading the hypervisor state may be conducted and the procedure may be resumed with step S42.

In step S41, updating the VCPU GIC registers may be conducted.

Subsequently, in step S42, loading the guest OS state may be performed.

Finally, returning to the guest VM may be conducted.

The virtual timer IRQ number is recorded in a timer device tree entry third IRQ. A number in the timer device tree entry specifies the virtual IRQ number that is delivered to hypervisor mode once virtual time expires.

The virtual timer node in the device tree entry for arch_timers is shown in FIG. 4.

The hypervisor may know the used virtual interrupt number. This can be done in different parts of the LINUX host OS architecture timer setup. One option is to use for instance the following pseudo code flow.

i). Specify global virt_irq_num—variable ii). Specify LINUX kernel compile time configuration option CONFIGURE_KVM_TIMER_OPTIMIZATION to enable virtual timer delivery optimization iii). In arm_arch_timer.c in arch_timer_init( )—function following code path records used virtual IRQ number:

```
#ifdef CONFIGURE_KVM_TIMER_OPTIMIZATION
if(is_hyp_mode_available( )) {
    virt_irq_num = arch_timer_ppi[VIRT_PPI];
}
#endif
```

In FIG. 4, the dotted line represents modifications in the LINUX host OS, the dashed line shows modifications in the KVM.

Figure 5:
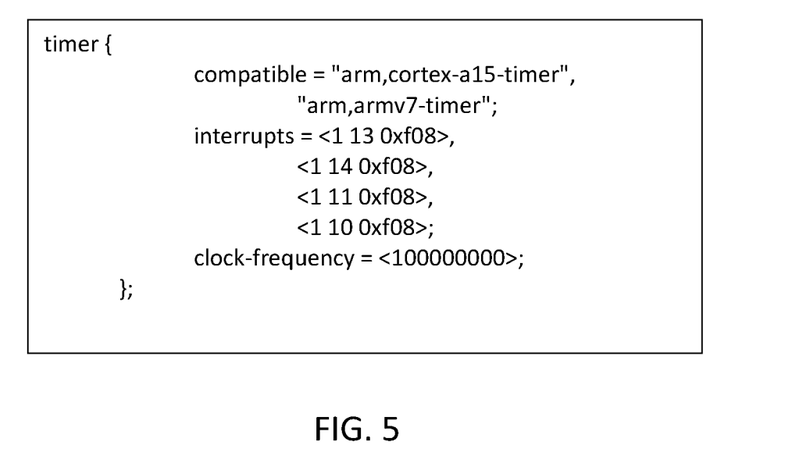
FIG. 5 shows a schematic diagram of an example of virtual timer IRQ number in an ARM arch_timer device tree entry according to one embodiment of the present disclosure.

FIG. 5 shows a schematic diagram of an example of virtual timer IRQ number in ARM arch_timer device tree entry according to one embodiment of the present disclosure.

Figure 6:
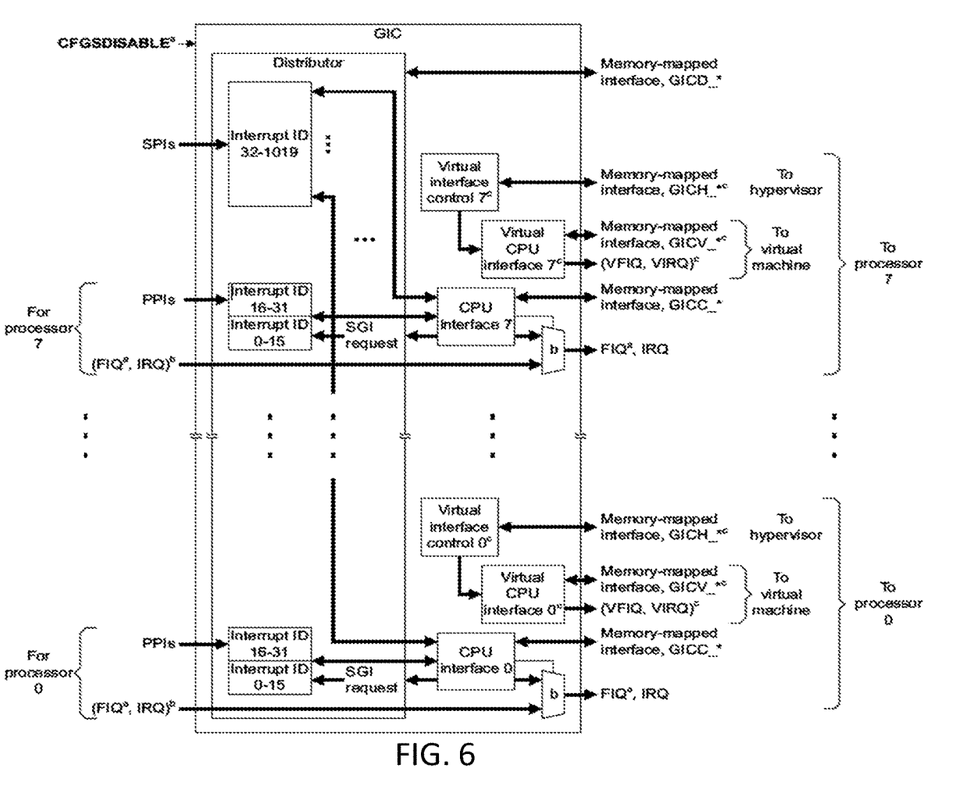
FIG. 6 shows a schematic diagram of an example of a GICv2 architecture diagram according to one embodiment of the present disclosure.

FIG. 6 shows a schematic diagram of a GICv2 architecture diagram according to one embodiment of the present disclosure.

FIG. 6 shows a schematic diagram of a GIC or GICv2 partitioning. The GIC or GICv2 architecture may split logically into a distributor block and one or more CPU interface blocks. According to an exemplary embodiment of the present disclosure, the GIC virtualization extensions add one or more virtual CPU interfaces to the GIC. Therefore, as FIG. 6 shows, the logical partitioning of the GIC is as follows.

According to an exemplary embodiment of the present disclosure, a distributor block may be defined. The Distributor block performs interrupt prioritization and distribution to the CPU interface blocks that connect to the processors in the system. The Distributor block registers are identified by the GILD_prefix.

Further, according to an exemplary embodiment of the present disclosure, CPU interfaces may be used. Each CPU interface block may perform priority masking and preemption handling for a connected processor in the system. CPU interface block registers are identified by the GICC_prefix. When describing a GIC that includes the GIC Virtualization Extensions, a CPU interface is sometimes called a physical CPU interface, to avoid possible confusion with a virtual CPU interface.

According to an exemplary embodiment of the present disclosure, virtual CPU interfaces may be used. The GIC Virtualization Extensions add a virtual CPU interface for each processor in the system.

According to an exemplary embodiment of the present disclosure, a virtual interface control may be used. The main component of the virtual interface control block is the GIC virtual interface control registers that include a list of active and pending virtual interrupts for the current VM on the connected processor.

According to an exemplary embodiment of the present disclosure, these registers are managed by the hypervisor that is running on that processor. Virtual interface control block registers are identified by the GICH_prefix.

Further, a virtual CPU interface may be used. Each virtual CPU interface block provides physical signaling of virtual interrupts to the connected processor. The ARM processor may process virtualization extensions signals and use these interrupts to the current VM on that processor.

According to an exemplary embodiment of the present disclosure, the GIC virtual CPU interface registers, accessed by the VM, provide interrupt control and status information for the virtual interrupts. The format of these registers is similar to the format of the physical registers. Further, CPU interface registers may be configured. Virtual CPU interface block registers are identified by the GICV_prefix.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the disclosure beyond those described herein.

While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A device for hardware virtualization support to handle an interrupt, wherein the device comprises:
    a memory configured to store instructions; and
    one or more processors coupled to the memory and configured to execute the instructions, which cause the processor to be configured to:
        run a hypervisor, a host system, and a virtual machine (VM) separately at the device;
        process a configuration flag (CF) in the host system, wherein the CF enables delivery of a virtual timer of the host system to a guest operating system (OS) of the VM;
        record, by the host system, a virtual interrupt request (IRQ) number of the virtual timer when the CF is set, wherein the virtual IRQ number is a value identifying which of the VM or the host system a physical interrupt targets; and
        deliver, by the hypervisor, the virtual timer to the guest OS with or without loading a host OS state of the host system based on whether the CF flag is set and whether the virtual IRQ number identifies the VM or the host system.

2. The device of claim 1, wherein the physical interrupt is taken in a hypervisor mode, and wherein the processor is further configured to perform virtualization for the physical interrupt taken in the hypervisor mode.

3. The device of claim 1, the virtual timer is delivered to the guest OS while loading the host OS state of the host system when the CF flag is not set and when the virtual IRQ number identifies the VM or the host system.

4. The device of claim 1, wherein the virtual timer is delivered to the guest OS without loading the host OS state of the host system when the CF flag is set and when the virtual IRQ number identifies the VM.

5. The device of claim 4, wherein the virtual timer is delivered to the guest OS while loading the host OS state of the host system when the CF flag is set and when the virtual IRQ number identifies the host system.

6. The device of claim 5, wherein the instructions further cause the processor to be configured to:
    update a generic interrupt controller (GIC) list register with an IRQ corresponding to the virtual IRQ number; and
    return back to a guest OS state prior to the interrupt.

7. The device of claim 1, wherein the instructions further cause the processor to be configured to record the virtual IRQ number in a timer device tree entry.

8. The device of claim 7, wherein the instructions further cause the processor to be configured to specify the virtual IRQ number to be recorded.

9. The device of claim 8, wherein the instructions further cause the processor to be configured to specify the virtual IRQ number according to a physical IRQ number that is delivered once the virtual timer is expired.

10. An apparatus for hardware virtualization support to handle an interrupt, wherein the apparatus comprises:
    a memory configured to store instructions; and
    one or more processor coupled to the memory and configured to execute the instructions, which cause the processor to be configured to:
        run a hypervisor, a host system, and a virtual machine (VM) separately at the apparatus;
        access the host system of the apparatus from the VM;
        process, by the host system, a virtual timer interrupt request (IRQ) number of a virtual timer of the host system when a configuration flag (CF) is set to deliver the virtual timer to a guest operating system (OS) of the VM, wherein the virtual IRQ number is a value identifying which of the VM or the host system a physical interrupt targets;
        record, by the host system, the virtual IRQ number of the virtual timer when the CF is set; and
        deliver, by the hypervisor, the virtual timer to the guest OS with or without loading a host OS state of the host system based on whether the CF flag is set and whether the virtual IRQ number identifies the VM or the host system.

11. An apparatus for hardware virtualization support to handle an interrupt, wherein the apparatus comprises:
    a memory configured to store instructions; and
    one or more processors coupled to the memory and configured to execute the instructions, which cause the processor to be configured to:

run a hypervisor, a host system, and a virtual machine (VM) separately at the apparatus;

process, by the host system of the apparatus, a configuration flag (CF) in the host system that enables delivery of a virtual timer of the host system to a guest operating system (OS) of the VM;

record, by the host system, a virtual interrupt request (IRQ) number of the virtual time when the CF is set, wherein the virtual IRQ number is a value identifying which of the VM or the host system a physical interrupt targets; and deliver, by the hypervisor, the virtual timer to the guest OS with or without loading a host OS state of the host system based on whether the CF flag is set and whether the virtual IRQ number identifies the VM or the host system.

12. A method for hardware virtualization support performed by a device to handle an interrupt), wherein the method comprises:

running, by one or more processors of the device, a hypervisor, a host system, and a virtual machine (VM) separately at the device;

processing, by the one or more processors of the device, a configuration flag (CF) in a host system that enables delivery of a virtual timer of the host system to a guest operating system (OS) of the VM;

recording, by the one or more processors, a virtual interrupt request (IRQ) number of the virtual timer when the CF is set, wherein the virtual IRQ number is a value identifying which of the VM or the host system a physical interrupt targets; and delivering, by the hypervisor executed by the one or more processors, the virtual timer to the guest OS with or without loading a host OS state of the host system based on whether the CF flag is set and whether the virtual IRQ number identifies the VM or the host system.

13. The method of claim 12, wherein the physical interrupt taken in a hypervisor mode, and wherein the method further comprises performing virtualization for the physical interrupt taken in the hypervisor mode.

14. The method of claim 12, wherein the virtual timer is delivered to the guest OS state while loading the host OS state of the host system when the CF flag is not set and when the virtual IRQ number identifies the VM or the host system.

15. The method of claim 12, wherein the virtual timer is delivered to the guest OS without loading the host OS state of the host system when the CF flag is set and when the virtual IRQ number identifies the VM.

16. The device of claim 1, wherein the host system is accessible by the hypervisor configured to launch the VM.

17. The device of claim 1, wherein the host system is further configured to control the virtual timer.

18. The apparatus of claim 10, wherein the hypervisor is further configured to launch the VM.

19. The apparatus of claim 11, wherein the host system is further configured to control the virtual timer.

20. The method of claim 12, wherein the host system is accessible by the hypervisor configured to launch the VM.

* * * * *

UNITED STATES PATENT AND TRADEMARK OFFICE
CERTIFICATE OF CORRECTION

PATENT NO. : 11,086,655 B2
APPLICATION NO. : 16/514638
DATED : August 10, 2021
INVENTOR(S) : Jani Kokkonen Page 1 of 1

It is certified that error appears in the above-identified patent and that said Letters Patent is hereby corrected as shown below:

In the Claims

Claim 12, Column 11, Line 18: "handle an interrupt), wherein" should read "handle an interrupt, wherein"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*